June 24, 1930.  R. WÖRSCHING  1,766,090

MEANS FOR OBTAINING VERY SHARP PHOTOGRAPHS WITH FREE CAMERAS

Filed April 5, 1926

Inventor:
Richard Wörsching
by Paul D. Schilling
Attorney

Patented June 24, 1930

1,766,090

UNITED STATES PATENT OFFICE

RICHARD WÖRSCHING, OF STARNBERG, GERMANY

MEANS FOR OBTAINING VERY SHARP PHOTOGRAPHS WITH FREE CAMERAS

Application filed April 5, 1926, Serial No. 99,687, and in Germany February 10, 1926.

It is very difficult to obtain a sharp photo, by means of cameras held in the hands. The vibration at the releasing of the catch is transmitted upon the camera wherefrom result, at instantaneous exposures of less than $\frac{1}{2_5}$ of a second, imperceptible movements of the camera so that the photo becomes blurred. If however a longer exposure is necessary a stand or any other stationary support must be used, as it is impossible to hold the camera in the hands for a longer time so that it does not shake. There are however cases where neither a stand nor a stationary support are at disposal so that it is impossible to make exposures of longer duration which produce sharp photos.

This invention relates to means for ensuring the stability of a camera held in the hands, which is necessary for instantaneous and time-exposures so that sharp photos are obtained.

The device according to the invention consists of a non-rigid stretching element attached to the camera and of adjustable length, the other end of which element can be fixed or connected with a stationary point outside the camera.

An embodiment of the invention is shown, by way of example, in the accompanying drawing in which:—

Figure 1:
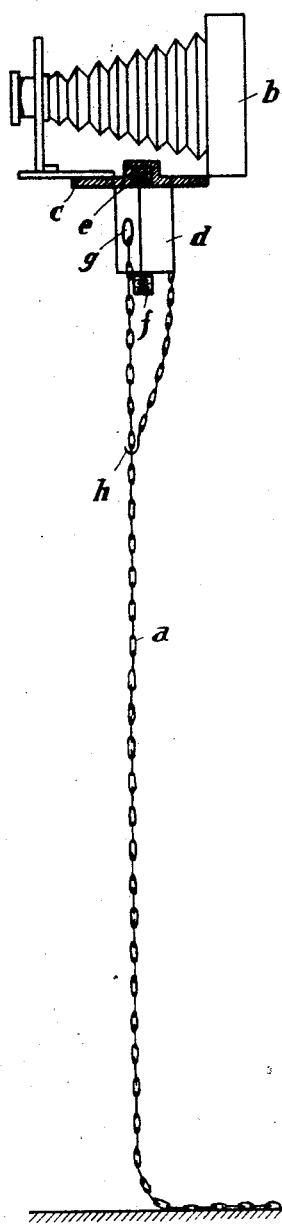
Fig. 1 shows the camera with the holding device attached.
Figure 2:
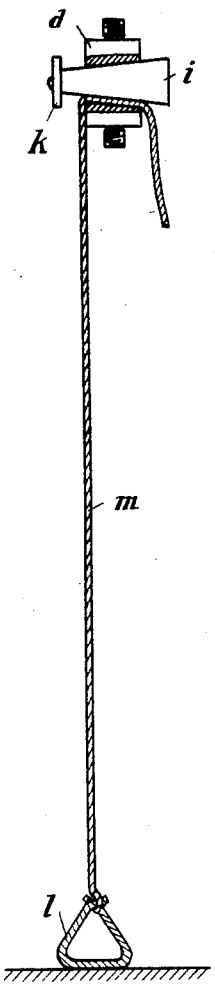
Fig. 2 shows another form of construction of a holding device.

The holding device may be of convenient material and it consists for instance, as shown in Fig. 1, of a metal chain $a$ or, as shown in Fig. 2, of a string $m$. The metal chain $a$ or string $m$ is attached on the camera $b$ in any convenient manner, for instance, with the aid of a bracket member or stud $d$ having at each end thereof a vertical threaded extension $e, f$ for fitting it at one of said ends into the threaded bore normally provided in the bottom plate $c$ of the camera. The stud $d$ has a transverse bore $g$ through which one end of the chain $a$ is passed which end is then attached to the chain $a$ at a lower portion of the same by means of a hook $h$ so that a loop is formed. The camera held in the hands is adjusted accordingly, the free end of the chain $a$ lying on the ground. The photographer puts his foot onto the free end of the chain $a$ and stretches the chain by lifting the camera $b$. To hold the camera more securely the camera is preferably pressed against the chest. The camera is thus securely fixed in any position so that it can no longer vibrate and it may then be used for instantaneous- or time-exposures.

In the form of construction shown in Fig. 2, a string $m$ is used instead of the chain $a$. The string $m$ is clamped in the stud $d$ so that its length can be regulated at will. With this object in view the stud $d$ has a wedge-shaped slot designed to receive a wedge $i$ for clamping the end of the string. The wedge $i$ is preferably secured in position by means of a cotter $k$. As in the case the end of the string attached to the camera is adjustable the free end $l$ of the string $m$ is loop-shaped so that a foot can be inserted into this loop to securely hold the string on the ground.

I claim:—

Means for steadying a camera by anchoring it to the ground while it is held in the hands of the operator so that sharp photographs can be obtained, comprising an oblong rectangular cast-metal bracket member having a transverse opening extending therethrough from side to side thereof and provided at an end thereof with a machine-screw stud for engagement with a coacting socket centrally arranged in the bottom of the camera, whereby the bracket member is adapted to be secured to the camera, an anchoring device consisting of a single length of linear flexible material having one end movable through the opening in the bracket, whereby the anchoring device may be adjusted for varying its effective operative length, the other end of said device being free from connection with the bracket so as to depend therefrom and be disposed to permit it to be held by the pressure of the foot of the operator against the ground surface, and a fastening element for holding the first-named end of said anchoring device against shifting movement.

In testimony whereof I affix my signature.

RICHARD WÖRSCHING.